United States Patent
Yi

(10) Patent No.: US 6,693,991 B2
(45) Date of Patent: Feb. 17, 2004

(54) PRIORITY AUTO-CONTROL METHOD OF SIGNAL ROUTES IN NO. 7 SIGNALING NETWORK

(75) Inventor: Seung-Hee Yi, Kyungki-Do (KR)

(73) Assignee: LG Electronics, Inc., Seoul (KR)

( * ) Notice: Subject to any disclaimer, the term of this patent is extended or adjusted under 35 U.S.C. 154(b) by 124 days.

(21) Appl. No.: 09/725,194

(22) Filed: Nov. 29, 2000

(65) Prior Publication Data

US 2001/0002190 A1 May 31, 2001

(30) Foreign Application Priority Data

Nov. 30, 1999 (KR) .......................................... 1999-53998

(51) Int. Cl.⁷ .............................................. H04M 1/24
(52) U.S. Cl. .................... 379/22.01; 370/249; 370/256; 370/351
(58) Field of Search ............................. 379/1.01, 10.01, 379/10.02, 15.02, 15.04, 16, 22, 22.01, 22.02, 23; 370/248, 249, 400, 256, 351, 408

(56) References Cited

U.S. PATENT DOCUMENTS

| | | | | |
|---|---|---|---|---|
| 4,745,593 A | * | 5/1988 | Stewart | 370/15 |
| 5,265,092 A | * | 11/1993 | Soloway et al. | 370/238 |
| 5,278,823 A | * | 1/1994 | Handel | 370/13 |
| 5,430,727 A | * | 7/1995 | Callon | 370/401 |
| 5,471,467 A | * | 11/1995 | Johann | 370/238 |
| 5,481,673 A | * | 1/1996 | Michelson | 395/200.15 |
| 5,544,154 A | * | 8/1996 | Glitho | 370/17 |
| 5,553,058 A | * | 9/1996 | Glitho | 370/13 |
| 5,583,848 A | * | 12/1996 | Glitho | 370/248 |
| 5,754,543 A | * | 5/1998 | Seid | 370/351 |
| 5,864,563 A | * | 1/1999 | Ratcliffe | 371/20.1 |
| 5,878,031 A | * | 3/1999 | Ahmad et al. | 370/249 |
| 5,881,051 A | * | 3/1999 | Arrowood et al. | 370/248 |
| 6,115,393 A | * | 9/2000 | Engel et al. | 370/469 |
| 6,195,416 B1 | * | 2/2001 | DeCaluwe et al. | 379/32.05 |
| 6,205,210 B1 | * | 3/2001 | Rainey et al. | 379/114.28 |
| 6,327,260 B1 | * | 12/2001 | McGrew | 370/385 |

* cited by examiner

Primary Examiner—Binh Tieu
(74) Attorney, Agent, or Firm—Fleshner & Kim, LLP

(57) ABSTRACT

A priority auto-control method of signal routes in a No. 7 signaling network is disclosed. In a preferred embodiment, it can improve usefulness and efficiency of the No. 7 signaling network by newly defining a MHT message and a MHA message in accordance with a MTP signal message standard form. It then performs a test of the all available signal routes from an originating point to a terminating point by using the MHT and MHA message. It thus automatically optimizes the priority of the signal routes in accordance with a state change of the signaling network, without requiring operator intervention.

42 Claims, 3 Drawing Sheets

PRIORITY AUTO-CONTROL METHOD OF SIGNAL ROUTES IN NO. 7 SIGNALING NETWORK

BACKGROUND OF THE INVENTION

1. Field of the Invention

The present invention relates to a No. 7 signaling network, and in particular to a priority auto-control method of signal routes in the No. 7 signaling network.

2. Background of the Related Art

A No. 7 signal method, as defined by the ITU-T, has been adopted as a signaling system for exchanges in a mobile communication network. It is a common channel signaling method. In the No. 7 signaling method, when two or more signal routes are available to a terminating signaling point, an operator of the signaling network routes the signal messages by controlling priority between the signal routes.

FIG. 1 illustrates a typical configuration of the No. 7 signaling network. For purposes of this example, it will be assumed all Signaling Link Sets in the signaling network are available and are normal routes. Referring to FIG. 1, when a signaling point A is an originating signaling point (hereinafter referred to a originating point) and a signaling point F is a terminating signaling point (hereinafter referred to a terminating point), a prescribed signal message is transmitted from the signaling point A to the signaling point F.

Available signal routes between signaling points A and F include the signal routes passing through a Signaling Link Set AB or AC. Because there are two routes, the operator of the signaling network determines the priority between the available signal routes. The operator then designates each of the Signaling Link Sets AB and AC as a normal route or an alternate route.

An assembly of each available signal route operation mode is described below in Table 1.

TABLE 1

| | Signaling Link Set AB | Signaling Link Set AC | Remark |
| --- | --- | --- | --- |
| Case 1 | Normal Route | Normal Route | Transfer a user part signal message by dividing it as ½ |
| Case 2 | Normal Route | Alternative Route | Transfer the user part signal message only to the Signaling Link Set AB |
| Case 3 | Alternative Route | Normal Route | Transfer the user part signal message only to the Signaling Link Set AC |
| Case 4 | Alternative Route | Alternative Route | It is impossible to use |

In Table 1, the "Normal Route" identifies the signal route used in transmission of a signaling network managing message toward a prescribed signaling point and a user part signal message when the signaling network is in normal state, i.e., without having any occurrence of error. The "Alternative Route" identifies the signal route used only to transmit the signaling network managing message when the signaling network is in normal state. The Alternative Route is also used to transmit the signaling network managing messages and user part signal messages when errors occur on all normal routes toward a signaling point.

Accordingly as depicted in Case 1 of Table 1, when a signal message is transmitted from signaling point A to F in a No. 7 signaling network, all signal routes passing through the Signaling Link Sets AB and AC are normal signal routes. The operator of the signaling network therefor transfers the user part signal message of a Message Transfer Part MTP) from the signaling point A to the terminating point F by allotting each half of the user part signal message to the Signaling Link Sets passing through routes AB and AC.

In Case 2, the signal route passing through the Signaling Link Set AB is a normal route and the signal route passing through the Signaling Link Set AC is an alternative route. The operator of the signaling network therefor transfers the user part signal message of a MTP from the signaling point A to the terminating point F only through the signal route passing through the Signaling Link Set AB.

In Case 3, the signal route passing through the Signaling Link Set AB is an alternative route, and the signal route passing through the Signaling Link Set AC is a normal route. The operator of the signaling network therefor transmits the user part signal message of a MTP from the signaling point A to the terminating point F only through the signal route passing through the Signaling Link Set AC.

In Case 4, the signal route passing through the Signaling Link Set AB and AC are both alternative routes. The signal message cannot be transmitted from the signaling point A to signaling point F.

As described above, the related signal message routing in the No. 7 signaling network has several problems. For example, the routing is performed by the operator of the signaling network. That operator is required to recognize the connection configuration of the whole signaling network and a state of the Signaling Link Sets. Based on that information, the operator designates the operation modes (normal route/alternative route) of the signal routes.

When the signaling network has an easy and simple configuration, the operator can readily identify the configuration of the whole signaling network and can optimize the operation mode of the signal route for each signaling point in the signaling network. When, however, the signaling network is larger and/or more complex, the related method is very difficult to use, and could result in many errors.

Also, when a plurality of network companies and interlocking signaling networks are present, it is difficult to optimize the signaling networks due to generation of complicated signal routes.

In addition, when errors occur in the signaling network, the optimum signal route corresponding to a certain terminating point may be changed on the signaling point. The operator of the signaling network may not be able to cope with the situation. Accordingly, the signaling network could operate in a non-optimum state for a certain time.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is an object of the present invention to provide a priority auto-control method of signal routes in the No. 7 signaling network, which overcomes the problems due to the disadvantages in the related art.

It is another object of the present invention to provide a priority auto-control method of signal routes in the No. 7 signaling network, which is capable of improving efficiency in a signaling network.

It is another object of the present invention to provide a priority auto-control method of signal routes in the No. 7 signaling network, which automatically controls priority of the signal route in the signaling network by newly defining a Message Transfer Part (MTP) signaling network test message and corresponding answer message and using the signaling network test message and answer message when not less than two signal routes toward a certain terminating point are available.

In order to achieve at least these objects, in whole or in parts, there is provided a MHT (MTP Hop Test:MTP Hop Test message) and a MHA (MTP Hop Acknowledgment-:MHT answer message) in the No. 7 network in accordance with a standard form of the MTP signal message, which automatically controls the priority of the available signal routes between a terminating point and an originating point.

Moreover, to achieve at least the above objects in whole or in parts, there is further provided a priority auto-control method of signal routes in a No. 7 signaling network including a transmitting process transmitting the MHT message for testing the each signal route after detecting available signal routes toward the terminating point (test ending signaling point), a transferring process transferring the MHT message to the test ending signaling point when the signaling point receiving the MHT message is not the test ending signaling point, a transmitting process transmitting the MHA message as the answer message corresponding to the MHT message to the test starting signaling point when the signaling point receiving the MHT message is the test ending signaling point, and a controlling process controlling automatically the priority of the available signal routes by using the message information after the originating point (test starting signaling point) receiving the MHA message.

To achieve at least the above objects in whole or in parts, there is further a priority control method of signal routes in a common-channel signaling network, including defining a signal message for testing a plurality of available signal routes between a test starting signaling point and a test ending signaling point, and automatically controlling a priority of the available signal routes after performing a testing process using the defined signal message for a prescribed time.

To achieve at least the above objects in whole or in parts, there is further a method of controlling a signal route in a communications network, including generating at least one dynamically changeable message at a first signaling point and sending the at least one message to a second signaling point over a corresponding signaling route having at least one intermediate signaling point, and comparing message information of all received messages at the second signaling point and setting a priority order among the signaling routes based on the received message information.

To achieve at least the above objects in whole or in parts, there is further a signal network, including a plurality of signaling nodes coupled by corresponding signaling routes, wherein a first signaling node of the plurality of signaling nodes generates a first signal message and transmits the first signal message to a final signaling node of the plurality of signaling nodes, and the final signaling node generates a second signal message based on the first signal message and transmits the second signal message to the first signaling node, wherein information comprising the second signal message controls a priority of the signal routes in the signal network.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

To automatically control the priority of the signal routes in a No. 7 signaling network according to the preferred embodiment of the present invention, major parameters of a MTP signaling network test message (or MTP Hop Test) (hereinafter referred to as MHT) and an answer message (or MTP Hop Acknowledgment) (hereinafter referred to as MHA) are newly defined, as shown below in Table 2.

TABLE 2

| Signaling Link Set | Hop Count | Fixed* | Starting Point Code | Fixed* | Ending Point Code | Heading Code H1 | Heading Code H0 | Routing Label |
|---|---|---|---|---|---|---|---|---|
| 16-bit | 8-bit | 2-bit | 14-bit | 2-bit | 14-bit | 4-bit | 4-bit | 32-bit |

*Fixed is preferably filled with Bit '00'.

The general forms of the MHT and MHA message, as herein defined, follow the MTP message form recommended by the ITU-T Q.70x. Each parameter will now be described.

The 32-bit Routing Label is included in all No. 7 signal messages. Its detailed construction is described below in Table 3.

TABLE 3

| SLS | Originating Point Code | Destination Point Code |
|---|---|---|
| 4-bit | 14-bit | 14-bit |

While the MHT/MHA signal message is being routed, the Routing Label of the MHT/MHA signal message can be continually changed at the transit signaling point (if necessary).

The 4-bit Heading Codes H0 and H1 are identifiers discriminating each MTP signaling network managing message. They newly assign values that are not currently used (except existing using values) in definition of the pertinent signal message. The 14-bit Starting Point Code is the signal code of the originating point performing the test with the MHT message. The Ending Point Code is the signal code of the terminating point to be tested. The pertinent message is continually routed until it reaches the Ending Point Code.

The Hop Count is the number of legs to be traveled between the source and destination. It is initially set to '0' when the first MHT message originates. It increases by '1' whenever the MHT message passes through a transit signaling point, until it reaches the Ending Point Code. It then is transferred to the pertinent test ending signaling point.

The 16-bit Signaling Link Set is for discriminating the signal route passing through a certain Signaling Link Set used in the transmission of the MHT message. It uses the value of the MHT message by reproducing the MHT message in generation of the MHA message.

In addition, the MHA message, as the answer message corresponding to the MHT message, is generated so as to have the same parameter form as the MHT message when the MHT message reaches the test ending signaling point, and is transmitted to the test starting point.

Figure 2:
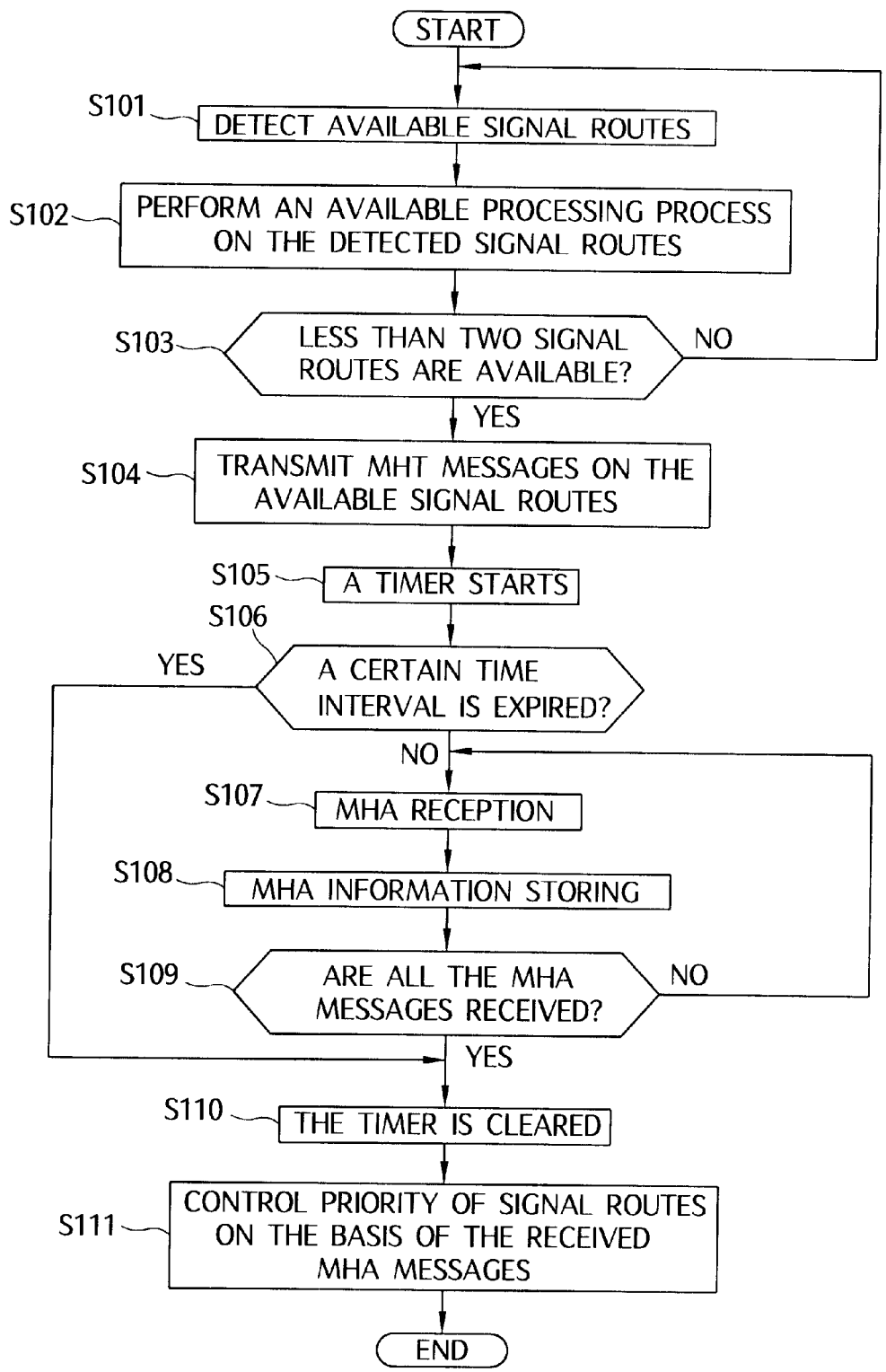
FIG. 2 is a flow chart illustrating the preferred embodiment of a signal message processing process on a test starting signaling point in order to control priority of signal routes in a No. 7 signaling network.

The signal message processing process for automatically controlling the priority of the signal routes in the No. 7 signaling network will now be described with reference to FIG. 2.

Figure 1:
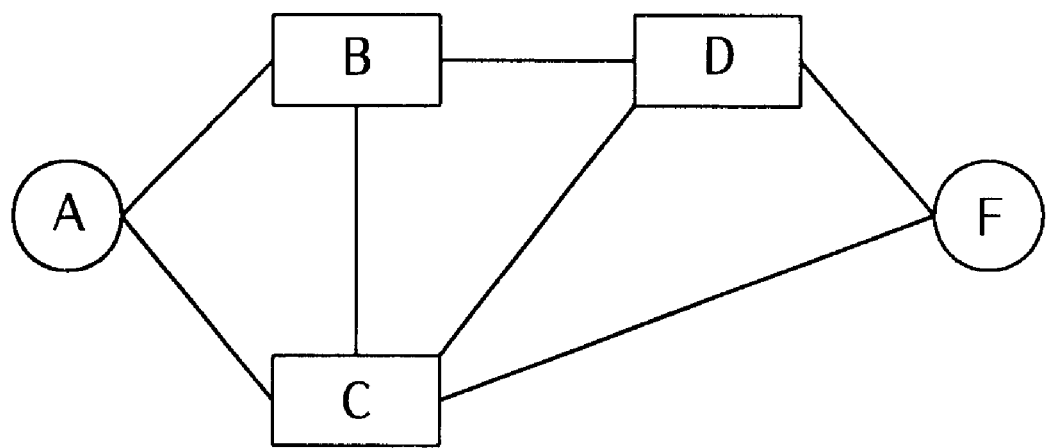
FIG. 1 is a block diagram illustrating a configuration of a typical No. 7 signaling network.

First, in a No. 7 signaling network, such as that depicted in FIG. 1, when a signal message is transmitted from signaling point A to signaling point F, signaling point A performs a MHT message transmitting procedure through all available signal routes.

In other words, the available signal routes from the originating point A to the terminating point F (as shown in FIG. 1) are detected, as shown in Step S101. The available signal routes are then processed for the pertinent terminating point, as shown in Step S102. After that, a message transmission unit of the originating point A determines whether there are fewer than two available signal routes to the terminating point F, as shown in Step S103. If fewer than two available signal routes exist, there is no need to control the priority of signal routes. Accordingly, the process returns to Step S101 and waits for new available signal routes.

If, however, it is determined in Step S103 that two or more available signal routes exist, then the message transmission unit transmits the MHT message having the above described form through all available signal routes to the pertinent terminating point, as shown in Step S104. For example, when all signal routes are available, the originating point transmits the MHT message to the transit signaling points B and C (FIG. 1).

At the same time, in order to define a wait time for which to wait for reception of the MHA message as the answer message corresponding to the transmitted MHT message, a timer is generated, as shown in Step S105. The timer takes the count for setting a certain time, as shown in Step S106. The value of the timer is preferably determined by multiplying maximum transmission delay value by maximum Hop Count.

Figure 3:
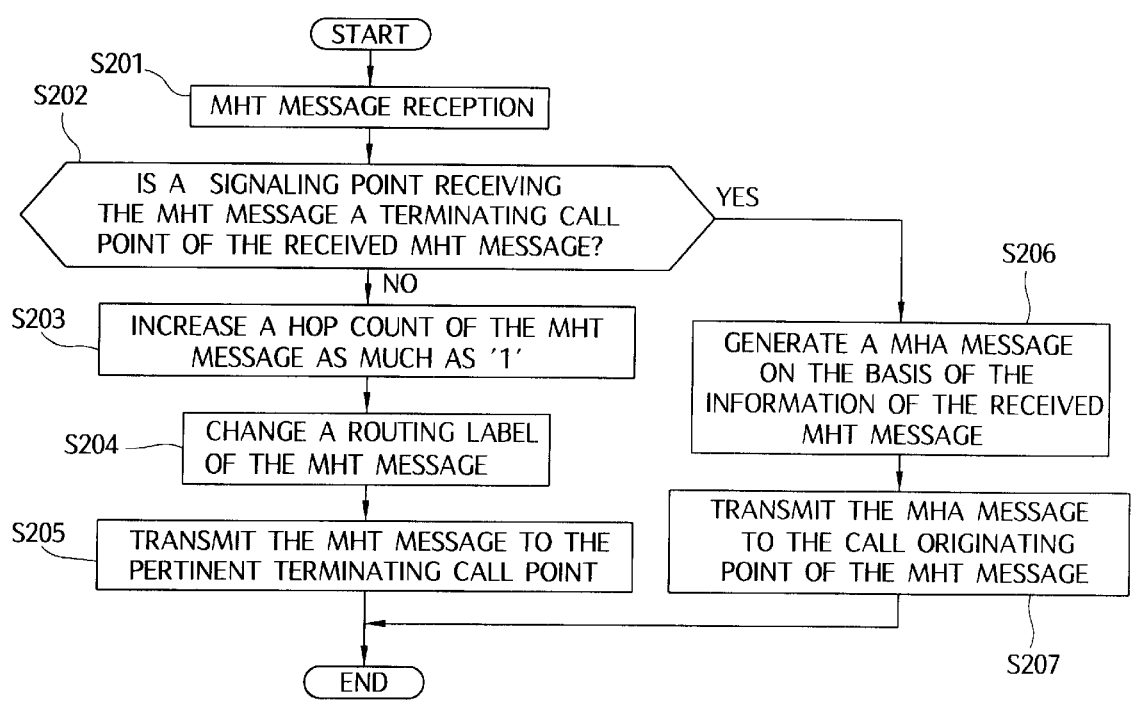
FIG. 3 is a flow chart illustrating a second embodiment of a signal message processing process on a test transit signaling point or ending signaling point in order to control priority of signal routes in a No. 7 signaling network.

Referring to FIG. 3, a signal message processing process of the terminating point and the transit signaling points B, C, D receiving the MHT message transmitted from the originating point A is described.

First, the MHT message transmitted from the signaling point A is received by the signaling point B or C, as shown in Step S201. It is determined whether the signaling point B or C is the test ending signaling point. This is done by checking the Ending Point Code of the MHT message, as shown in Step S202.

As a result of the above process, the signaling point which is not the test ending signaling point increases the Hop Count of the MHT message by '1' S203, changes a Routing Label of the MHT message, as shown in Step S204, and performs routing of the signal message to the next signaling point, as shown in Step S205.

In other words, if the signaling point B is not the test ending signaling point, it transmits the MHT message to the signaling points C and D. Likewise, if the signaling point C is not the test ending signaling point, it transmits the MHT message to the signaling points B, D and F. If other points are present, they are likewise included.

Each transit signaling point transmits the pertinent MHT message to a final test ending signaling point, for example F, by performing Steps 201 to 205 repeatedly.

The destination signaling point, for example F, eventually receives the MHT message, as shown in Step S201. It is then checked to determine if it is the test ending signaling point, as shown in Step S202. Next, it generates the MHA message based on the information of the received MHT message, as shown in Step S206. Finally, it transmits the pertinent MHA message to the test starting signaling point A, as shown in Step S207.

Referring back to FIG. 2, the test starting signaling point A accordingly receives the MHA message generated by the test ending signaling point in accordance with Step S106 for the certain setting time, as shown in Step S107. It stores the MHA message in memory, as shown in Step S108. It then determines whether it has received all of the MHA message from all available signal routes, as shown in Step S109, and deletes the timer, as shown in Step S110.

The priority of the signal route is controlled by analyzing the stored MHA message information, as shown in Step S111. For example, the priority of the signal routes is re-controlled by checking the Hop Count number of each MHA message and giving priority to the signal route having the smallest Hop Count. This optimizes transmission of the signal message to the signaling point F.

Meanwhile, it is determined whether the prescribed time interval has expired, as shown in Step S106. If the certain time interval has expired before the reception of the MHA message from all available signal routes has been completed, the timer operation is finished, as shown in Step S110, and the priority of the signal routes is controlled by analyzing the MHA messages received until that time, as shown in Step S111.

As described above, the priority auto-control method of signal routes in a No. 7 signaling network as described herein has several advantages. For example, it can improve usefulness and efficiency of the No. 7 signaling network by newly defining the MHT message and MHA message in accordance with the MTP signal message standard form. Moreover, it performs a test of all available signal routes from the originating point to terminating point by using the MHT, MHA message, and automatically optimizes the priority of the signal routes in accordance with state change of the signaling network. This is preferably done without intervention of the operator of the signaling network and controls the priority of the signal routes in the No. 7 signaling network.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A signal route control method for a No. 7 signaling network, comprising:

transmitting a Message Transfer Part (MTP) Hop Test (MHT) message over each of a plurality of available signal routes after detecting available signal routes to a test ending signaling point;

transferring each MHT message to a test ending signaling point over the available signal routes when the signaling point receiving the MHT message is not the test ending signaling point;

generating and transmitting to a test starting signaling point a MTP Hop Acknowledgment (MHA) message as an answer message corresponding to each MHT message sent over the available signal routes when the signaling point receiving the MHT message is the test ending signaling point; and controlling a priority order of the plurality of available signal routes using message information provided in each MHA message detected after the test starting signaling point receives each MHA message, wherein the MHT Message comprises a Hop Count as a major parameter;

wherein the Hop Count increases by a prescribed value each time the MHT message passes through a transit signaling point, until the MHT message reaches the test ending signaling point; and wherein the MHA message information comprises a value of the Hop Count at the test ending signaling point.

2. The method of claim 1, wherein the MHT message further comprises a Signaling Link Set, an Originating Point Code, a Destination Point Code, a Heading Code, a Routing Label as major parameters, and wherein the MHT message follows a standard form of a MTP message.

3. The method of claim 2, wherein the Heading Code is an identifier discriminating signaling network managing messages, and the Heading Code uses values which are not allocated among pre-defined values in the ITU-T Q.70x recommendation by allotting newly the value.

4. The method of claim 1, wherein the MHA message and the MHT message have the same parameters.

5. The method of claim 1, wherein the MHT message transmitting process is not performed when there are fewer than two available signal routes to the test ending signaling point.

6. The method of claim 2, wherein the MHT message transferring process increases the Hop Count of the MHT message by a prescribed value, changes the Routing Label, and transmits the MHT message to the test ending signaling point when the signaling point receiving the MHT message is not the Ending Point Code of the received MHT message.

7. The method of claim 1, wherein the MHA message transmitting process comprises generating a MHA message having a prescribed form, and transmitting the MHA message to the test starting signaling point when the signaling point receiving the MHT message is the Ending Point Code of the received MHT message.

8. The method of claim 1, wherein the controlling process comprises:

storing the MHA message after receiving the MHA message inputted through each signal route; and determining the priority order after analyzing the MHA messages when reception of the MHA message through all signal routes is completed.

9. The method of claim 8, wherein the controlling process determines the priority order of the signaling route based on the MHA messages received until then, even though the MHA messages are not received from the all signal routes when a prescribed time interval is expired.

10. The method of claim 1, wherein the controlling process controls the priority order of the signal routes by using a value of a Hop Count of the received MHA message, wherein the Hop Count parameter is increased by a prescribed value each time the MHA message passes through a signaling point.

11. The method of claim 2, wherein the prescribed value is 1, and wherein the Hop Count increases until the MHT message reaches a test ending signaling point.

12. The method of claim 6, wherein the prescribed value is 1.

13. The method of claim 1, further comprising determining a number of nodes from the test starting signaling point to the test ending signaling point by counting a total number of hops taken by the MHT message, and using the total number of hops to control the priority order.

14. The method of claim 13, wherein the total number of hops is not known until the MHT message reaches the test ending signaling point.

15. A priority control method of signal routes in a common-channel signaling network, comprising:

defining a signal message having at least one dynamically changing parameter for testing a plurality of available signal routes between a test starting signaling point and a test ending signaling point, the dynamically changing parameter reaching a final value when the signal message is received at the test ending signaling point; and automatically controlling a priority order of the available signal routes based on the final value of the dynamically changing parameter after performing a testing process using the defined signal message for a prescribed period of time, wherein the priority order of the signal routes is determined by a number of transit signaling points between the test starting signaling point and test ending signaling point, and wherein the dynamically changing parameter counts the number of transit signaling points such that the final value of the dynamically changing parameter is the number of transit signaling points.

16. The method of claim 15, wherein the signal message follows a standard form of a MTP message, and comprises a Signaling Link Set, an Originating Point Code, a Destination Point Code, a Heading Code, a Routing Label, and a Hop Count, the Hop Count comprising the dynamically changing parameter.

17. The method of claim 16, wherein the Heading Code is an identifier discriminating signaling network managing messages, and the Heading Code newly assigns a value to an unused value among pre-defined values in the ITU-T Q.70x recommendation.

18. The method of claim 16, wherein the Hop Count increases by '1' whenever the MHT message passes through a transit signaling point, until it reaches the test ending signaling point.

19. The method of claim 18, further comprising determining the priority of signal routes in accordance with the final value of the dynamically changing parameter.

20. The method of claim 19, wherein the route causing the lowest Hop Count is set as a priority signal route.

21. The method of claim 15, wherein the prescribed time equals the product of a maximum transmission delay and a maximum Hop Count.

22. The method of claim 15, wherein the signal message is transferred from the test starting signaling point to the test ending signaling point through all available signal routes, and wherein the signal message passes through at least one intermediate signaling point, and wherein data of the signal message is dynamically changed to reflect a number of intermediate signaling points in each signaling route, and wherein a return signal message corresponding to the signal message is returned to the test starting signaling point after the signal reaches the test ending signaling point, and wherein signal message data is used to automatically control the priority order of the available signal routes.

23. The method of claim 22, wherein the signal message data includes a count of the number of intermediate signaling points.

24. The method of claim 15, further comprising generating an acknowledgment message at the test ending signaling point in response to receiving the signal message, wherein the acknowledgment message includes a parameter comprising the final value of the dynamically changing parameter, and wherein the acknowledgment message is transmitted to the test starting signaling point.

25. The method of claim 15, further comprising determining a number of signaling points from the test starting signaling point to the test ending signaling point by counting a total number of hops taken by the signal message, and using the total number of hops to control the priority order.

26. The method of claim 25, wherein the total number of hops is not known until the signal message reaches the test ending signaling point.

27. A method of controlling a signal route in a communications network, comprising:
generating at least two dynamically changeable messages at a first signaling point and sending the at least two messages to a second signaling point over corresponding signaling routes having at least one intermediate signaling point, the at least two dynamically changeable messages comprising a Hop Count parameter to count a number of signaling points that each of the corresponding signaling routes contains between the first signaling point and the second signaling point; and
comparing message information of a dynamically changeable parameter, the dynamically changeable parameter including at least the Hop Count parameter, of each of the dynamically changing messages received of all messages received at the second signaling point and setting a priority order among the signaling routes based on the received message information.

28. The method of claim 27, further comprising discarding messages received by the second signaling point after a prescribed period of time.

29. The method of claim 27, wherein the first signaling point is a termination point and the second signaling point is an originating point, and wherein the plurality of dynamically changeable messages are generated in response to a plurality of origination messages received from the originating point over a corresponding plurality of signaling routes.

30. The method of claim 29, wherein each of the plurality of origination messages comprises a Message Transfer Part (MTP) Hop Test (MHT) message, and each of the plurality of dynamically changeable messages comprises a MTP Hop Acknowledgment (MHA) message.

31. The method of claim 27, wherein a final value of the Hop Count parameter when each of the at least two dynamically changeable messages is received by the second signaling point is used to determine the priority order.

32. The method of claim 31, further comprising generating at least one reply message at the second signaling point, the at least one Reply message including the final value of the hop count parameter and sending the at least one reply message to the first signaling point, wherein data contained in the at least one reply message determines the priority order of the corresponding singling routes in the communications network.

33. The method of claim 27, further comprising generating at least one reply message at the second signaling point based on message information in the at least one dynamically changeable message, and sending the at least one reply message to the first signaling point, wherein data contained in the at least one reply message determines a priority of the corresponding singling routes in the communications network.

34. The method of claim 33, wherein the dynamically changeable message and the reply message follow a standard form of a MTP message, and comprises a Signaling Link Set, an Originating Point Code, a Destination Point Code, a Heading Code, a Routing Label, and a Hop Count.

35. The method of claim 34, wherein the Heading Code is an identifier discriminating signaling network managing messages, and the Heading Code newly assigns a value to an unused value among pre-defined values in the ITU-T Q.70x recommendation.

36. The method of claim 27, further comprising determining a number of signaling points over each corresponding signaling route from the first signaling point to the second signaling point by counting a total number of hops taken by each of the at least two dynamically changeable messages, and using the total number of hops by each of the at least two dynamically changeable messages to set the priority order.

37. The method of claim 36, wherein the total number of hops over each corresponding signaling route is not known until each of the at least two dynamically changeable messages reaches the second signaling point.

38. A signal network, comprising:
a plurality of signaling nodes coupled by a plurality of corresponding signaling routes, wherein a first signaling node of the plurality of signaling nodes generates a first dynamically changeable signal message and transmits the first dynamically changeable signal message to a final signaling node of the plurality of signaling nodes through at least one intermediate signaling node, the message being modified at each of the plurality of intermediate signaling nodes,
the final signaling node generates a second dynamically changeable signal message based on information provided by the first dynamically changeable signal message and transmits the second dynamically changeable signal message to the first signaling node through at least one intermediate signaling node, the message being modified at each of the plurality of intermediate signaling nodes, wherein information comprising the second dynamically changeable signal message controls a priority order of the plurality of signal routes in the signal network, and wherein a hop count of the first dynamically changeable signaling message is set to 0 at the first signaling node and is increased at each of the plurality of signaling nodes until the first dynamically changeable signaling message reaches the final signaling node where a final value of the hop count is determined for each signaling route, and wherein the final hop count for each signaling route is included in the second dynamically changeable signal message and is used to determine the priority order.

39. The method of claim 38, wherein the signal network is a No. 7 signaling network.

40. The method of claim 38, wherein the first signal message comprises a Message Transfer Part (MTP) Hop Test (MHT) and the second signal message comprises a MTP Hop Acknowledgement (MHA).

41. The network of claim 38, wherein a total number of signaling points is determined by determining a number of signaling nodes from the first signaling node to the final signaling node by counting a total number of hops taken by the first dynamically changeable signal message, the total number of hops being the final hop count.

42. The network of claim 41, wherein the to final hop count is not known until the first dynamically signal changeable message reaches the final signaling point.

* * * * *